(12) United States Patent
Heisey et al.

(10) Patent No.: US 12,429,256 B2
(45) Date of Patent: Sep. 30, 2025

(54) LIQUID INJECTION NOZZLES FOR CHILLER MOTOR

(71) Applicant: Johnson Controls Technology Company, Auburn Hills, MI (US)

(72) Inventors: Matthew L. Heisey, York, PA (US); Paul W. Snell, York, PA (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 1185 days.

(21) Appl. No.: 16/495,766

(22) PCT Filed: Mar. 23, 2018

(86) PCT No.: PCT/US2018/024120
§ 371 (c)(1),
(2) Date: Sep. 19, 2019

(87) PCT Pub. No.: WO2018/175948
PCT Pub. Date: Sep. 27, 2018

(65) Prior Publication Data
US 2020/0109883 A1    Apr. 9, 2020

Related U.S. Application Data

(60) Provisional application No. 62/476,455, filed on Mar. 24, 2017.

(51) Int. Cl.
*H02K 9/20* (2006.01)
*F25B 31/00* (2006.01)
*H02K 5/20* (2006.01)

(52) U.S. Cl.
CPC ........... *F25B 31/008* (2013.01); *H02K 5/203* (2021.01); *H02K 9/20* (2013.01)

(58) Field of Classification Search
CPC .. H02K 5/20; H02K 9/20; H02K 9/00; H02K 5/203; F04B 39/06; F04B 53/08;
(Continued)

(56) References Cited

U.S. PATENT DOCUMENTS 3,122,894 A * 3/1964 Bernhard ............... F25B 31/008
                                                    62/505
3,241,331 A * 3/1966 Endress ................. F25B 31/008
                                                    62/505
(Continued)

FOREIGN PATENT DOCUMENTS

CN    104471842 A    3/2015
CN    105051467 A    11/2015
(Continued)

OTHER PUBLICATIONS

Carrier. Product Data AquaEdge High-Efficiency Semi-Hermetic Centrifugal Liquid Chillers 500 to 800 Nominal Tons (1758 to 2814 Nominal kW), Jul. 1, 2018. 28 pages.
(Continued)

*Primary Examiner* — Essama Omgba
*Assistant Examiner* — Dnyanesh G Kasture
(74) *Attorney, Agent, or Firm* — Fletcher Yoder, PC

(57) ABSTRACT

An induction motor for a chiller assembly is provided. The induction motor includes a housing and a stator having a cylindrical shape with a first end, a second end, an interior surface, and an exterior surface. The cylindrical shape defines a central axis. The induction motor further includes a rotor and a shaft with a first end and a second end. The rotor and the shaft are configured to rotate within the interior cylindrical surface of the stator about the central axis. The induction motor additionally includes a first bearing assembly located proximate the first end of the shaft, a second bearing assembly located proximate the second end of the
(Continued)

shaft, a first nozzle ring and a second nozzle ring. The first and second nozzle rings are configured to direct a cooling fluid between the interior surface of the stator and the rotor.

20 Claims, 6 Drawing Sheets

(58) Field of Classification Search
CPC ...... F04D 25/082; F04D 29/58; F04D 29/582; F04D 29/5806; F04D 29/584; F04D 29/5846
USPC .......................................... 417/198, 366–373
See application file for complete search history.

(56) References Cited

U.S. PATENT DOCUMENTS

| | | | |
|---|---|---|---|
| 3,479,541 A * | 11/1969 | Robinson | H02K 9/20 310/64 |
| 4,487,553 A * | 12/1984 | Nagata | F04F 5/466 417/171 |
| 4,899,555 A | 2/1990 | Shaw | |
| 5,511,389 A | 4/1996 | Bush et al. | |
| 5,682,074 A | 10/1997 | Di Pietro et al. | |
| 6,254,361 B1 * | 7/2001 | Sabini | F04D 13/0633 417/370 |
| 6,884,043 B2 * | 4/2005 | Kimberlin | F04C 14/06 417/357 |
| 7,204,099 B2 | 4/2007 | Lifson et al. | |
| 7,345,384 B2 | 3/2008 | Yoshida et al. | |
| 7,397,154 B2 * | 7/2008 | Tilton | H02K 5/20 310/64 |
| 7,439,646 B2 | 10/2008 | Birdi et al. | |
| 7,704,056 B2 * | 4/2010 | Masoudipour | F04D 25/0606 62/505 |
| 8,581,455 B2 | 11/2013 | Woolmer | |
| 8,760,014 B2 | 6/2014 | Birdi et al. | |
| 8,823,223 B2 | 9/2014 | Han et al. | |
| 8,959,950 B2 | 2/2015 | Doty et al. | |
| 2002/0077209 A1 | 6/2002 | El-Antably et al. | |
| 2003/0132679 A1 * | 7/2003 | Kato | H02K 15/0428 310/179 |
| 2004/0262999 A1 | 12/2004 | Yoshida et al. | |
| 2007/0194639 A1 | 8/2007 | Birdi et al. | |
| 2009/0242174 A1 * | 10/2009 | McCutchen | F01K 25/08 165/104.25 |
| 2011/0049976 A1 * | 3/2011 | Suzuki | H05K 7/203 307/9.1 |
| 2012/0133222 A1 | 5/2012 | Han et al. | |
| 2013/0015730 A1 | 1/2013 | Waddell et al. | |
| 2013/0068852 A1 * | 3/2013 | Wurz | F04F 5/463 239/10 |
| 2013/0229072 A1 * | 9/2013 | Matsuda | B62J 41/00 310/53 |
| 2014/0054985 A1 * | 2/2014 | Neiszer | H02K 1/276 310/43 |
| 2014/0127050 A1 | 5/2014 | Oda et al. | |
| 2014/0265657 A1 | 9/2014 | Raczek | |
| 2015/0204350 A1 | 7/2015 | Sishtla | |
| 2015/0276282 A1 * | 10/2015 | Heiden | F04D 29/5806 62/505 |
| 2021/0030141 A1 * | 2/2021 | Goo | A61B 90/98 |

FOREIGN PATENT DOCUMENTS

| | | |
|---|---|---|
| EP | 0 668 444 | 8/1995 |
| EP | 1 215 418 A1 | 6/2002 |
| JP | H10501399 A | 2/1998 |
| JP | 2016056966 A | 4/2016 |
| TW | 563287 | 11/2003 |
| TW | 200838100 A | 9/2008 |
| WO | WO-2014/089551 A1 | 6/2014 |
| WO | WO-2013/011939 | 2/2015 |
| WO | WO-2016/160783 A1 | 10/2016 |
| WO | WO-2017/027701 A1 | 2/2017 |

OTHER PUBLICATIONS

International Search Report and Written Opinion for International Application No. PCT/US2018/024120 dated Jul. 5, 2018, 14 pages.
Taiwanese Office Action for Application No. TW 107110029 dated Dec. 5, 2018, 9 pages.
Chinese Office Action for CN Application No. 201880019806.1 mailed Sep. 29, 2020, 11 pgs.
European Office Action for EP Application No. 18716859.6 mailed Nov. 24, 2020, 7 pgs.
Japanese Office Action for JP Application No. 2019-551535, dated Jan. 18, 2022, 6 pgs.
Chinese Office Action for CN Application No. 201880019806.1, dated Mar. 24, 2022, 7 pgs.

* cited by examiner

SECTION B-B

LIQUID INJECTION NOZZLES FOR CHILLER MOTOR

CROSS-REFERENCE TO RELATED PATENT APPLICATIONS

This application is a U.S. National Stage Application of PCT/US2018/024120, filed Mar. 23, 2018, which claims the benefit of U.S. Provisional Application 62/476,455, filed Mar. 24, 2017, both of which are incorporated herein by reference in their entirety.

BACKGROUND

The present disclosure relates generally to an induction motor that drives the centrifugal compressor of a chiller assembly. Some centrifugal compressors utilize medium pressure (MP) refrigerant that require high speed permanent magnet motors in order to achieve a required pressure rise. Utilizing a low pressure (LP) refrigerant permits the use of cheaper and simpler induction motors that operate at lower speeds. However, the use of LP refrigerant in a motor cooling system requires a higher volumetric flow rate than an MP refrigerant. The higher volumetric flow rate results in high pressure drop and restricted flow rates through the motor cooling system, decreasing the effectiveness of the motor cooling system and resulting in motor temperatures exceeding maximum limits. When the motor temperature is not maintained within peak efficiency ranges, the overall performance of the chiller assembly is degraded.

SUMMARY

One implementation of the present disclosure is an induction motor for a chiller assembly. The induction motor includes a housing and a stator having a cylindrical shape with a first end, a second end, an interior surface, and an exterior surface. The cylindrical shape defines a central axis. The induction motor further includes a rotor and a shaft with a first end and a second end. The rotor and the shaft are configured to rotate within the interior surface of the stator about the central axis. The induction motor additionally includes a first bearing assembly located proximate the first end of the shaft, a second bearing assembly located proximate the second end of the shaft, a first nozzle ring coupled to the first bearing assembly, and a second nozzle ring coupled to the second bearing assembly. The first nozzle ring and the second nozzle ring are configured to direct a cooling fluid between the interior surface of the stator and the rotor.

Another implementation of the present disclosure is a nozzle ring for the induction motor of a chiller assembly. The nozzle ring includes a ring-shaped member defining a central axis, multiple inlet passages configured to receive a supply of cooling fluid, and multiple outlet passages fluidly coupled to the multiple inlet passages and configured to expel the supply of cooling fluid. The multiple outlet passages are angled relative to the central axis.

Still another implementation of the present disclosure is a cooling system for a motor to power a compressor in a vapor compression system. The cooling system includes a housing with a cavity configured to enclose a motor, a cooling fluid supply passage terminating in a first cooling fluid outlet and a second cooling fluid outlet, a first bearing assembly, a second bearing assembly, a first nozzle ring, and a second nozzle ring. The bearing assemblies include bearing housings with cooling fluid supply passages. The nozzle rings include outlet passages configured to expel the supply of cooling fluid onto the motor.

DETAILED DESCRIPTION

Figure 1:
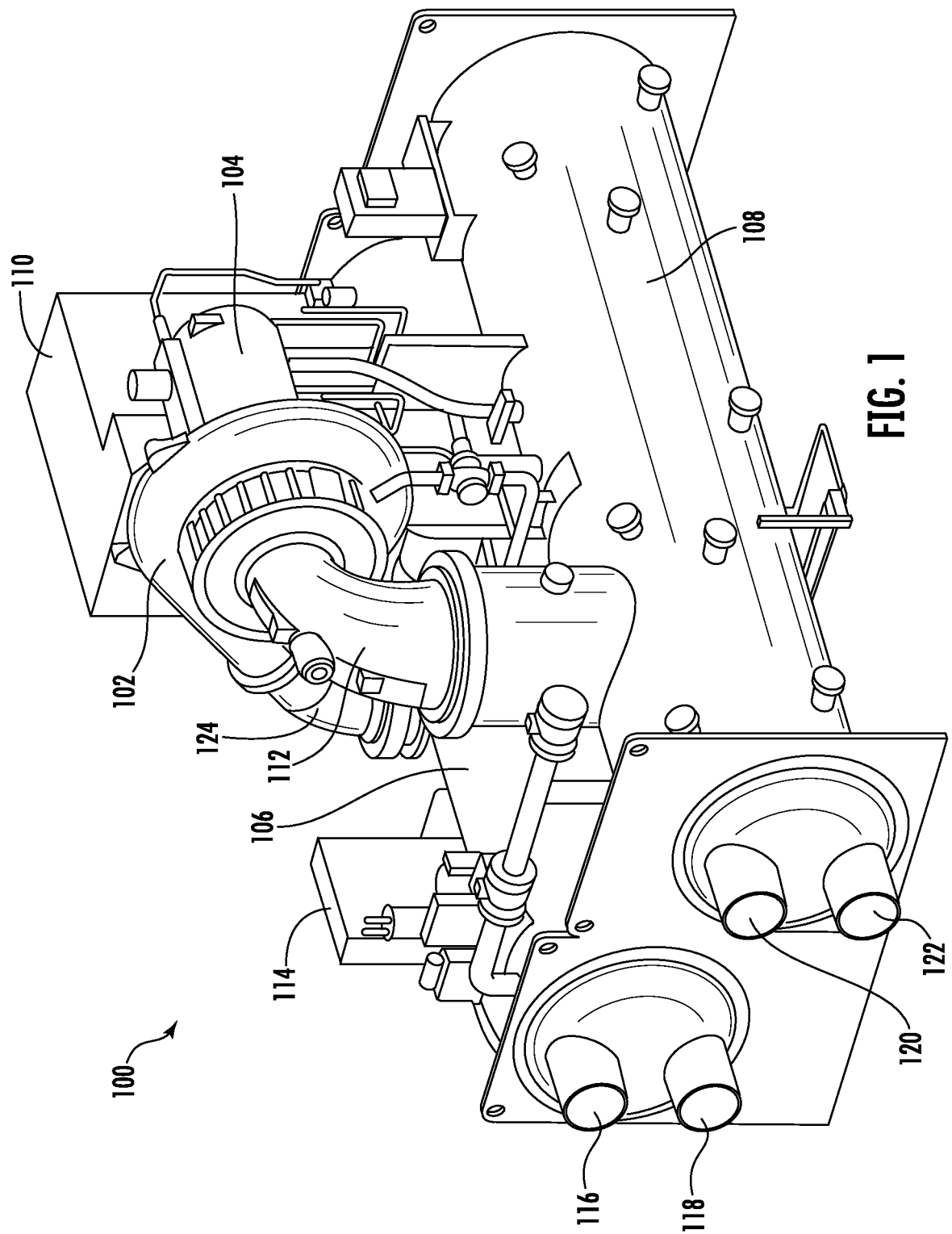
FIG. 1 is a perspective view drawing of a chiller assembly, according to some embodiments.
Figure 2:
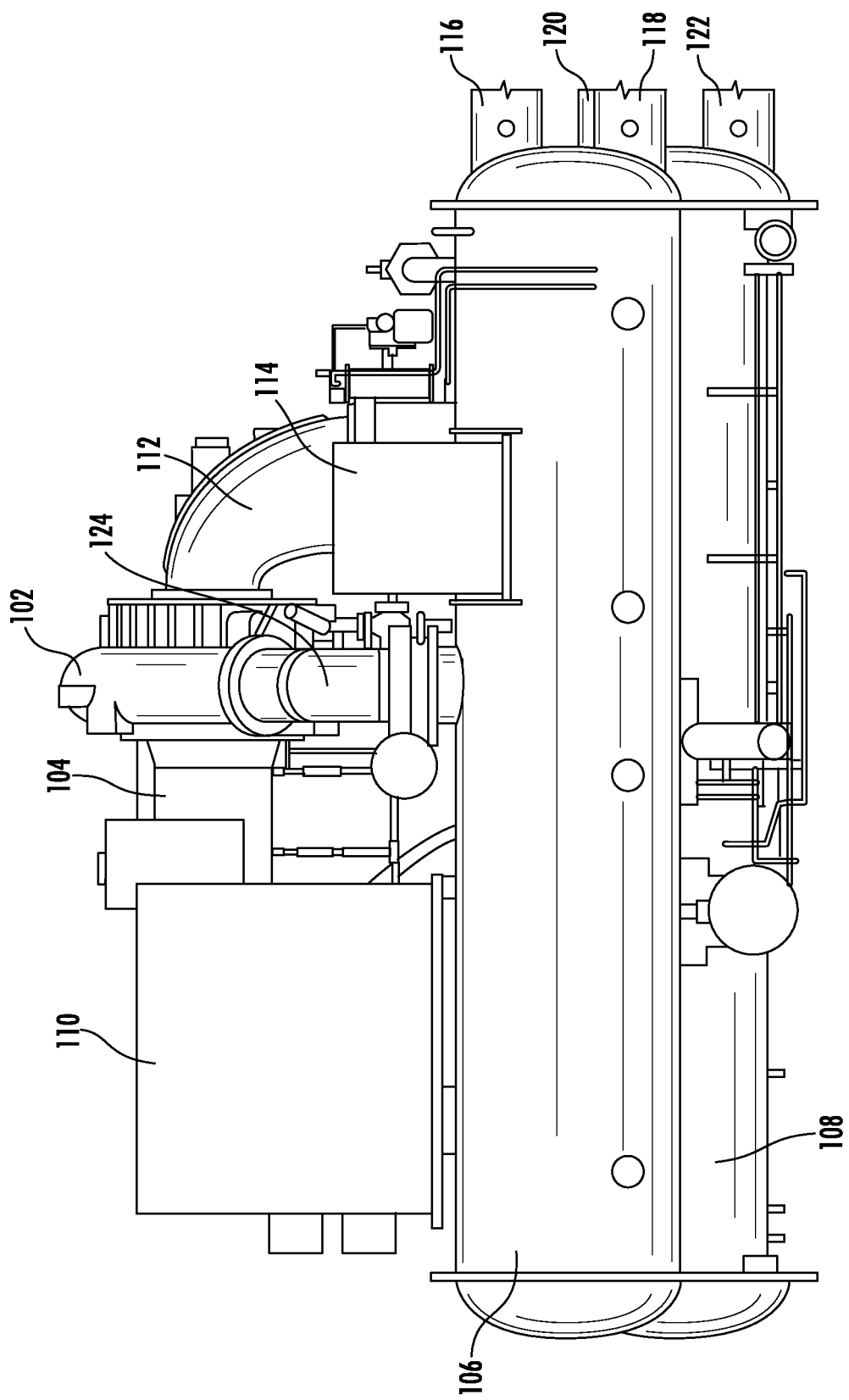
FIG. 2 is a front elevation view drawing of the chiller assembly of FIG. 1, according to some embodiments.

Referring generally to the FIGURES, a chiller assembly having a motor cooling system with liquid injection nozzles is shown. Referring to FIGS. 1-2, an example implementation of a chiller assembly 100 is depicted. Chiller assembly 100 is shown to include a compressor 102 driven by a motor 104, a condenser 106, and an evaporator 108. A refrigerant is circulated through chiller assembly 100 in a vapor compression cycle. Chiller assembly 100 can also include a control panel 114 to control operation of the vapor compression cycle within chiller assembly 100.

Motor 104 can be powered by a variable speed drive (VSD) 110. VSD 110 receives alternating current (AC) power having a particular fixed line voltage and fixed line frequency from an AC power source (not shown) and provides power having a variable voltage and frequency to motor 104. Motor 104 can be any type of electric motor than can be powered by a VSD 110. For example, motor 104 can be a high speed induction motor. Compressor 102 is driven by motor 104 to compress a refrigerant vapor received from evaporator 108 through suction line 112 and to deliver refrigerant vapor to condenser 106 through a discharge line 124. In the example described in FIGS. 1-2, compressor 102 is a centrifugal compressor.

Evaporator 108 includes an internal tube bundle (not shown), a supply line 120 and a return line 122 for supplying and removing a process fluid to the internal tube bundle. The supply line 120 and the return line 122 can be in fluid communication with a component within a HVAC system (e.g., an air handler) via conduits that that circulate the process fluid. The process fluid is a chilled liquid for cooling a building and can be, but is not limited to, water, ethylene glycol, calcium chloride brine, sodium chloride brine, or any other suitable liquid. Evaporator 108 is configured to lower the temperature of the process fluid as the process fluid passes through the tube bundle of evaporator 108 and exchanges heat with the refrigerant. Refrigerant vapor is formed in evaporator 108 by the refrigerant liquid delivered to the evaporator 108 exchanging heat with the process fluid and undergoing a phase change to refrigerant vapor.

Refrigerant vapor delivered by compressor 102 from evaporator 108 to condenser 106 transfers heat to a fluid. Refrigerant vapor condenses to refrigerant liquid in condenser 106 as a result of heat transfer with the fluid. The refrigerant liquid from condenser 106 flows through an expansion device and is returned to evaporator 108 to complete the refrigerant cycle of the chiller assembly 100. Condenser 106 includes a supply line 116 and a return line 118 for circulating fluid between the condenser 106 and an external component of the HVAC system (e.g., a cooling tower). Fluid supplied to the condenser 106 via return line 118 exchanges heat with the refrigerant in the condenser 106 and is removed from the condenser 106 via supply line 116 to complete the cycle. The fluid circulating through the condenser 106 can be water or any other suitable liquid.

Figure 3:
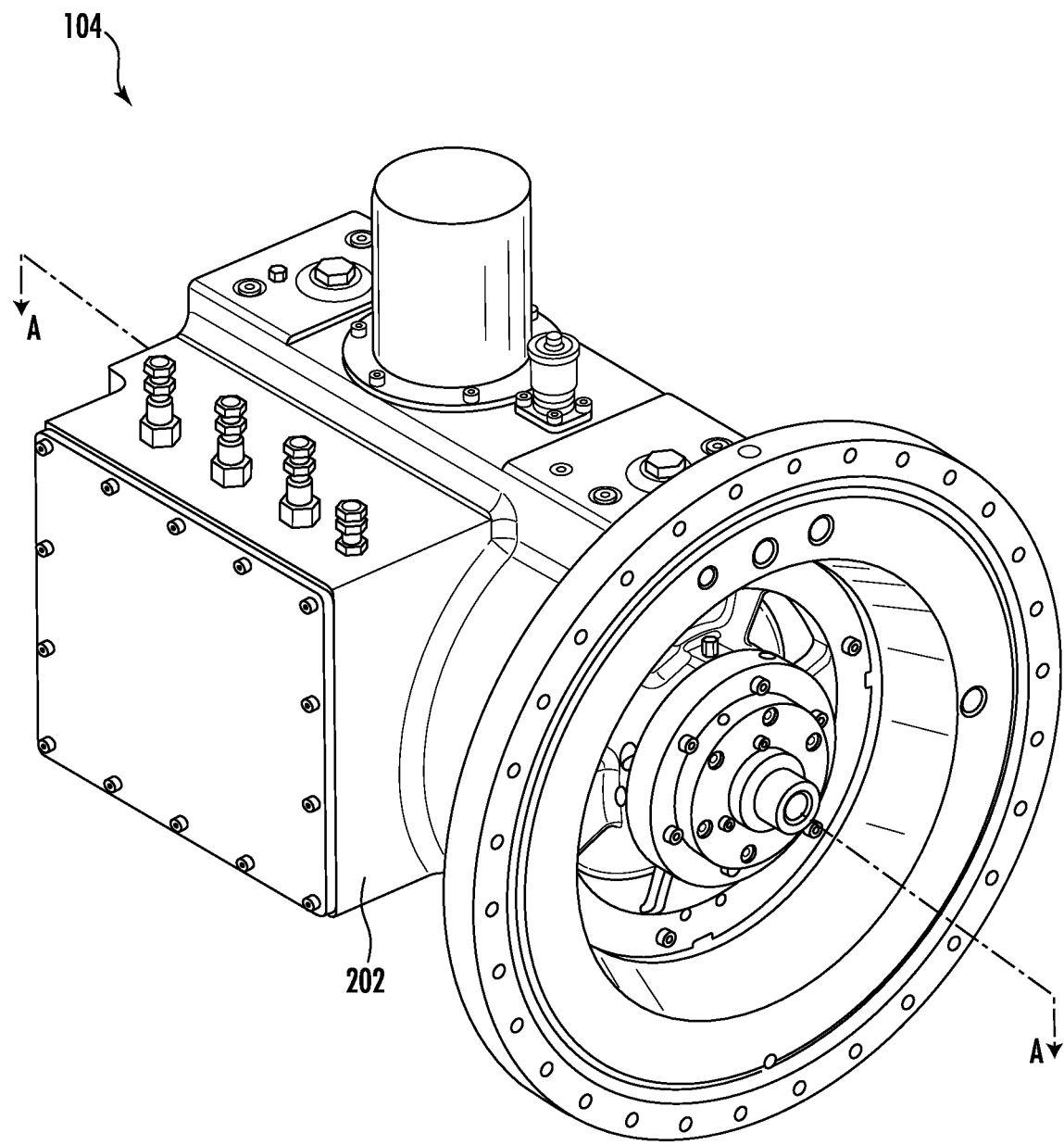
FIG. 3 is a perspective view drawing of a motor assembly used in the chiller assembly of FIG. 1, according to some embodiments.
Figure 4:
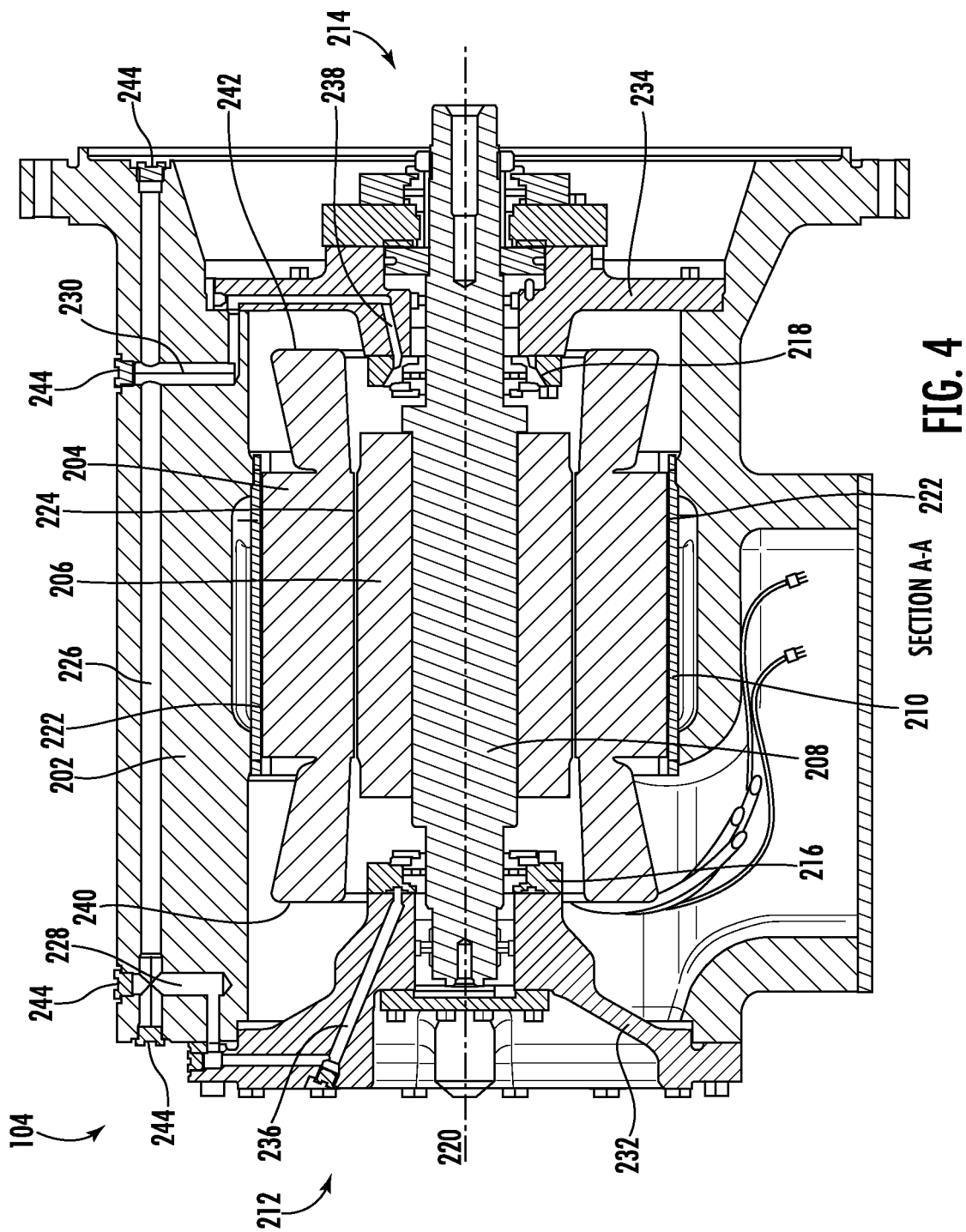
FIG. 4 is a section view drawing A-A of the motor assembly of FIG. 3, according to some embodiments.

Referring now to FIGS. 3-4, views of the motor 104 are shown, according to some embodiments. Specifically, FIG. 3 depicts an isometric view of the motor 104 including the motor housing 202, while FIG. 4 depicts a top sectional view A-A of the motor 104. Motor 104 is shown to include, among other components, an enclosure or housing 202, a stator 204, and a rotor 206. The stator 204 is the stationary part of the motor's electromagnetic circuit that imparts radial and axial magnetic forces on the rotor 206. In a properly aligned system, the sum of these forces is zero, or nearly zero. In some embodiments, the stator 204 is partially encapsulated by a motor jacket 210 that is coupled to an exterior surface 222 of the stator 204. Both the stator 204 and the motor jacket 210 may have a substantially cylindrical shape. The motor jacket 210 may be constructed from aluminum and may be configured to optimize heat transfer from the stator 204 to prevent overheating of the motor 104.

The rotor 206 is the rotating part of the motor's electromagnetic circuit. In various embodiments, the rotor 206 may be a squirrel-cage rotor, a wound rotor, a salient-pole rotor, or a cylindrical rotor. The rotor 206 is coupled to a shaft 208. The rotor 206 and the shaft 208 collectively rotate about a central axis 220 and within an interior surface 224 of the stator 204 in order to transmit torque and rotation to other components and/or assemblies (e.g., the compressor 102) that are coupled to the motor 104.

Housing 202 is shown to include a cooling fluid supply passage 226. Cooling fluid supply passage 226 may be supplied by one or more inlets 244 located in the motor housing 202. The inlets 244 may be fluidly coupled to a condenser assembly (e.g., condenser 106). Cooling fluid supply passage 226 is shown to extend parallel to the central axis 220 along nearly the entire length of the housing 202 and to terminate at a first cooling fluid outlet 228 and a second cooling fluid outlet 230. Each of the first cooling fluid outlet 228 and the second cooling fluid outlet 230 may be fluidly coupled to the cooling fluid passage of a bearing assembly, described in further detail below.

In some embodiments, the cooling fluid supplied from the condenser assembly is a low pressure (LP) refrigerant that has an operating pressure of less than 400 kPa or approximately 58 psi. In further embodiments, the LP refrigerant is R1233zd. R1233zd is a non-flammable fluorinated gas with low Global Warming Potential (GWP) relative to other refrigerants utilized in commercial chiller assemblies. GWP is a metric developed to allow comparisons of the global warming impacts of different gases, by quantifying how much energy the emissions of 1 ton of a gas will absorb over a given period of time, relative to the emissions of 1 ton of carbon dioxide.

Motor 104 is further shown to include a first bearing assembly 212 located at a first end of the shaft 208 and a second bearing assembly 214 located at a second end of the shaft 208. In some embodiments, the bearing assemblies 212 and 214 are oil lubricated bearings. The first bearing assembly 212 includes a first bearing housing 232, while the second bearing assembly 214 includes a second bearing housing 234. Each bearing housing may be detachably coupled to the motor housing 202, and each bearing housing includes a cooling fluid supply passage. As shown, the first supply passage 236 of the first bearing assembly 212 may be fluidly coupled to the first cooling fluid outlet 228 in the motor housing 202, while the second supply passage 238 of the second bearing assembly 214 may be fluidly coupled to the second cooling fluid outlet 230 in the motor 202.

Still referring to FIG. 4, motor 104 is shown to include a first nozzle ring 216 and a second nozzle ring 218. First nozzle ring 216 may be coupled to the first bearing housing 232 and located inboard of the first end 240 of the stator 204. Similarly, second nozzle ring 218 may be coupled to the second bearing housing 234 and located inboard of the second end 242 of the stator 204. This positioning permits the nozzle rings 216 and 218 to direct cooling fluid onto and between the rotor 206 and the interior surface 224 of the stator 204 where it vaporizes and contributes to cooling of the stator 204 and the rotor 206.

Each of the first nozzle ring 216 and the second nozzle ring 218 includes multiple fluid inlets and fluid outlets (described in further detail below with reference to FIGS. 5-6). The fluid inlets of the nozzle rings 216 and 218 are configured to fluidly couple to the cooling fluid supply passages 236 and 238 of the bearing assemblies 212 and 214. The fluid outlets of the nozzle rings 216 and 218 are configured to expel cooling fluid between the rotor 206 and the interior surface 224 of the stator 204. Thus, the components of motor 104 may be coupled such that continuous cooling fluid paths are created through the motor housing 202, the bearing assemblies 212 and 214, and the nozzle rings 216 and 218.

Figure 5:
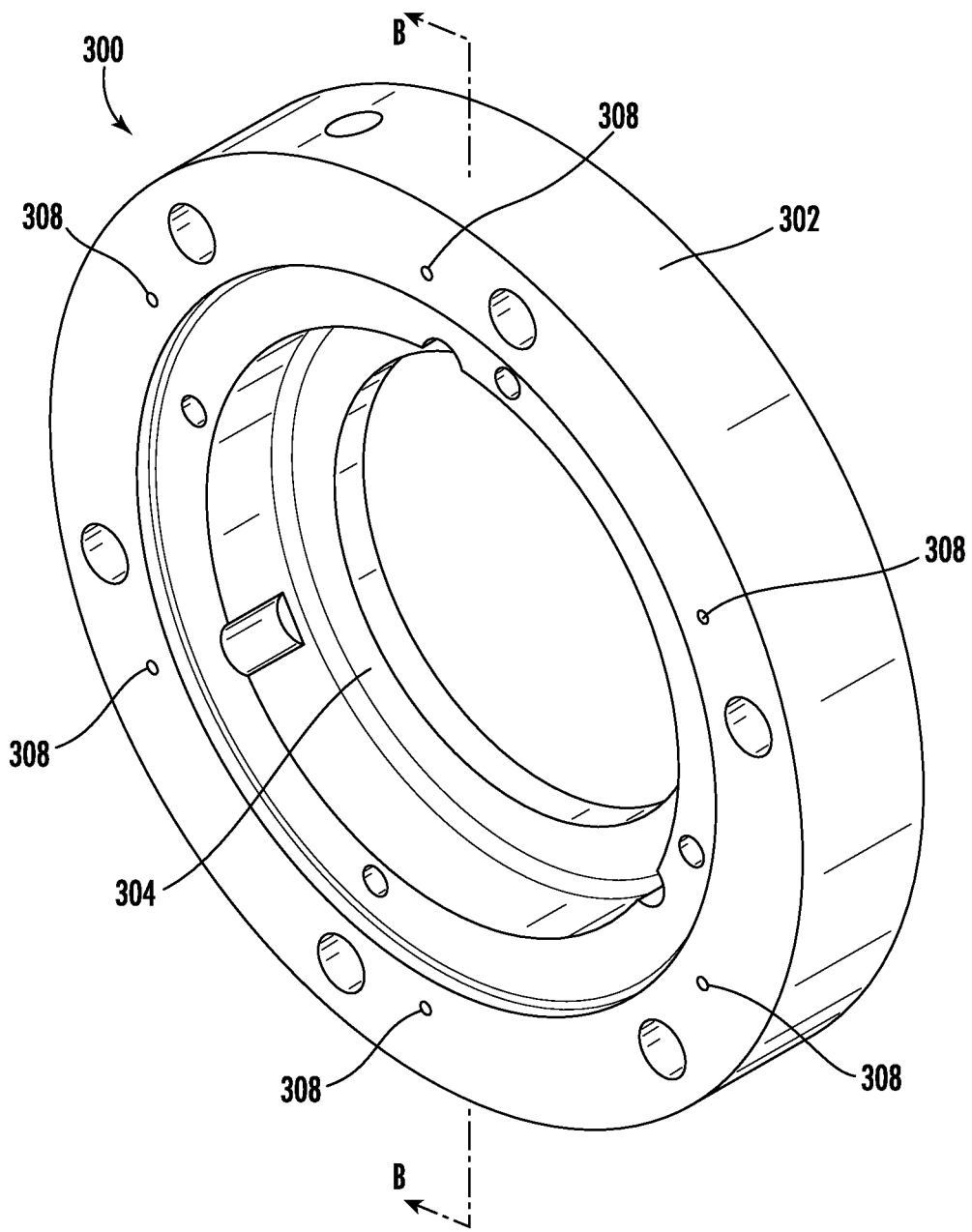
FIG. 5 is a perspective view drawing of a nozzle ring used in the motor assembly of FIG. 3, according to some embodiments.
Figure 6:
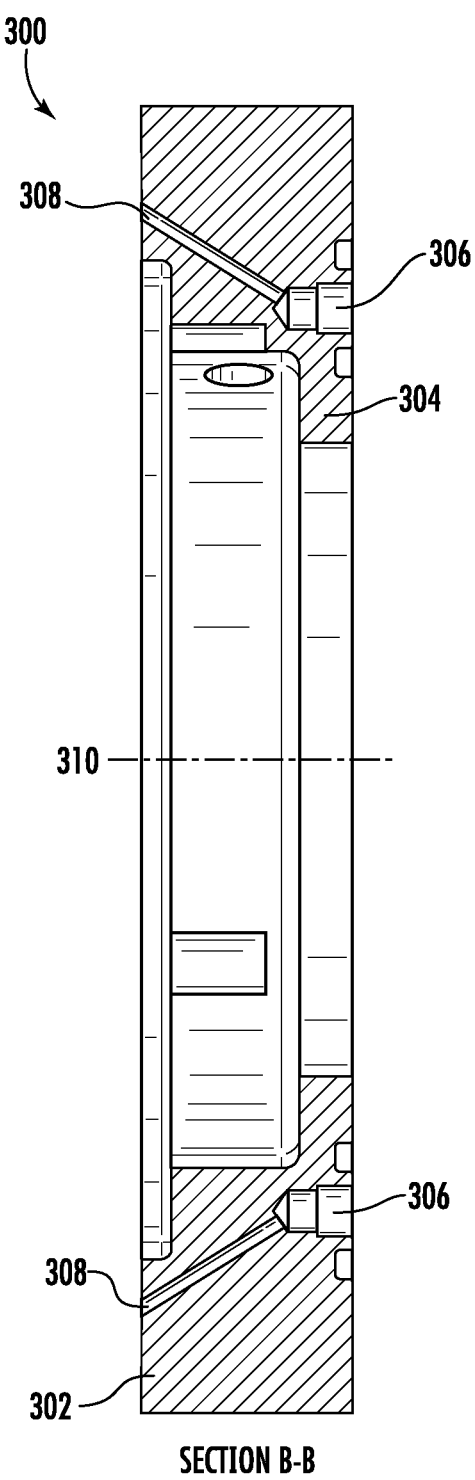
FIG. 6 is a section view drawing B-B of the nozzle ring of FIG. 5, according to some embodiments.

Turning now to FIGS. 5-6, views of a nozzle ring 300 are depicted, according to some embodiments. Specifically, FIG. 5 depicts an isometric view of nozzle ring 300, while FIG. 6 depicts a side sectional view B-B of the nozzle ring 300. In various embodiments, nozzle ring 300 is substantially similar to first nozzle ring 216 and second nozzle ring 218, described above with reference to FIG. 4. Nozzle ring 300 is shown to include a ring-shaped member with an outer diameter portion 302 and an inner diameter portion 304. In some embodiments, the dimensions of the outer diameter 302 are selected to match the housing of the bearing assembly (e.g., first bearing assembly 212, second bearing assembly 214). Similarly, the dimensions of the inner diameter portion 304 may be selected to permit the motor shaft (e.g., shaft 208) to pass through the nozzle ring 300 when the nozzle ring 300 is installed within the motor (e.g., motor 104).

Nozzle ring 300 is further shown to include multiple cooling fluid inlets 306 fluidly coupled to multiple cooling fluid outlets 308. The cooling fluid outlets 308 may be distributed in a radial pattern about the outer diameter portion 302 of the nozzle ring 300. In some embodiments, the radial pattern of the fluid outlets 308 may vary between nozzle rings (i.e., the radial pattern of the fluid outlets 308 on the first nozzle ring 216 may not be identical to the radial pattern of the fluid outlets 308 on the second nozzle ring 218). As depicted in FIG. 6, the diameter of the cooling fluid inlets 306 is larger than the diameter of the cooling fluid outlets 308, although in other embodiments the dimensions of the cooling fluid inlets 306 and cooling fluid outlets 308 may be any suitable dimensions required to achieve a desired cooling fluid flow rate through the nozzle ring 300. Similarly, although FIG. 6 depicts the orientation of the cooling fluid outlets 308 as angled outwards relative to a central axis 310 in order to direct fluid to the desired portion of the motor (i.e., between the rotor 206 and the interior surface 224 of the stator 204), in other embodiments, the cooling fluid outlets 308 may be any orientation to direct cooling fluid flow to a desired component of the motor.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. An induction motor for a chiller assembly, the induction motor comprising:
    a housing;
    a stator having a cylindrical shape comprising a first end, a second end, an interior surface, and an exterior surface, the cylindrical shape defining a central axis;
    a rotor;
    a shaft comprising a first end and a second end, the rotor and the shaft configured to rotate within the interior surface of the stator about the central axis;
    a first bearing assembly located proximate the first end of the shaft, wherein the first bearing assembly comprises a first bearing housing with a first cooling fluid supply passage extending through a first axial end face of the first bearing housing;
    a second bearing assembly located proximate the second end of the shaft, wherein the second bearing assembly comprises a second bearing housing with a second cooling fluid supply passage extending through a second axial end face of the second bearing housing; and
    a first nozzle ring abutting the first axial end face of the first bearing housing, and a second nozzle ring abutting the second axial end face of the second bearing housing, wherein the first nozzle ring is configured to receive a cooling fluid from the first cooling fluid supply passage of the first bearing housing, the second nozzle ring is configured to receive the cooling fluid from the second cooling fluid supply passage of the second bearing housing, the first nozzle ring and the second nozzle ring are configured to direct the cooling fluid between the interior surface of the stator and the rotor, and the induction motor is configured to receive the cooling fluid from a condenser assembly of the chiller assembly.

2. The induction motor of claim 1, wherein the housing comprises a third cooling fluid supply passage terminating in a first cooling fluid outlet and a second cooling fluid outlet.

3. The induction motor of claim 2, wherein the housing further comprises a cooling fluid inlet configured to fluidly couple the third cooling fluid supply passage to the condenser assembly, and the condenser assembly is configured to supply the cooling fluid to the induction motor.

4. The induction motor of claim 2, wherein the first cooling fluid supply passage of the first bearing housing of the first bearing assembly is fluidly coupled to the first cooling fluid outlet of the housing, and
    wherein the second cooling fluid supply passage of the second bearing housing of the second bearing assembly is fluidly coupled to the second cooling fluid outlet of the housing.

5. The induction motor of claim 1, wherein the first nozzle ring and the second nozzle ring each comprise a plurality of cooling fluid outlet passages distributed in a radial pattern about an outer diameter portion of the first nozzle ring and the second nozzle ring, respectively.

6. The induction motor of claim 5, wherein the plurality of cooling fluid outlet passages of each of the first nozzle ring and the second nozzle ring is angled relative to the central axis.

7. The induction motor of claim 5, wherein the plurality of cooling fluid outlet passages of the first nozzle ring is fluidly coupled to the first cooling fluid supply passage of the first bearing housing of the first bearing assembly, and
    wherein the plurality of cooling fluid outlet passages of the second nozzle ring is fluidly coupled to the second cooling fluid supply passage of the second bearing housing of the second bearing assembly.

8. The induction motor of claim 5, wherein the radial pattern of the plurality of cooling fluid outlet passages of the first nozzle ring is not identical to the radial pattern of the plurality of cooling fluid outlet passages of the second nozzle ring.

9. The induction motor of claim 1, wherein the first nozzle ring is located inboard of the first end of the stator, and wherein the second nozzle ring is located inboard of the second end of the stator.

10. The induction motor of claim 1, wherein the cooling fluid is a low pressure refrigerant having an operating pressure of less than 400 kPa.

11. The induction motor of claim 10, wherein the low pressure refrigerant is R1233zd.

12. The induction motor of claim 1, wherein the first nozzle ring comprises:
    a ring-shaped member defining an additional central axis;
    a plurality of inlet passages configured to receive the cooling fluid; and
    a plurality of outlet passages fluidly coupled to the plurality of inlet passages and configured to expel the cooling fluid, wherein the plurality of outlet passages is angled outwardly relative to the additional central axis.

13. The induction motor of claim 12, wherein the plurality of outlet passages is distributed in a radial pattern about an outer diameter portion of the ring-shaped member.

14. The induction motor of claim 12, wherein a diameter of each inlet passage of the plurality of inlet passages is larger than a diameter of each outlet passage of the plurality of outlet passages.

15. The induction motor of claim 1, wherein the first nozzle ring and the first bearing housing extend along the central axis in opposite directions relative to the first axial end face of the first bearing housing, and wherein the second nozzle ring and the second bearing housing extend along the central axis in opposite directions relative to the second axial end face of the second bearing housing.

16. A cooling system for a motor to power a compressor in a vapor compression system, the cooling system comprising:
- a housing comprising:
    - a cavity configured to enclose the motor, wherein the motor comprises a shaft coupled to a rotor, and the shaft and the rotor are configured to rotate within a stator; and
    - a first cooling fluid supply passage terminating in a first cooling fluid outlet and a second cooling fluid outlet, wherein the housing is configured to receive a supply of cooling fluid from a condenser assembly of the vapor compression system;
- a first bearing assembly and a second bearing assembly, wherein the first bearing assembly comprises a first bearing housing with a second cooling fluid supply passage extending through a first axial end face of the first bearing housing, and wherein the second bearing assembly comprises a second bearing housing with a third cooling fluid supply passage extending through a second axial end face of the second bearing housing; and
- a first nozzle ring abutting the first axial end face of the first bearing housing, and a second nozzle ring abutting the second axial end face of the second bearing housing, wherein the first nozzle ring is configured to receive the supply of cooling fluid from the second cooling fluid supply passage of the first bearing housing, the second nozzle ring is configured to receive the supply of cooling fluid from the third cooling fluid supply passage of the second bearing housing, each nozzle ring of the first nozzle ring and the second nozzle ring comprises a plurality of outlet passages configured to expel the supply of cooling fluid onto the motor, wherein the plurality of outlet passages of each of the first nozzle ring and the second nozzle ring is configured to expel the supply of cooling fluid between the stator and the rotor, and wherein the first nozzle ring and the second nozzle ring are each configured to be positioned entirely between a first axial end and a second axial end of the stator.

17. The cooling system of claim 16, wherein the first cooling fluid outlet in the housing is fluidly coupled to the second cooling fluid supply passage in the first bearing housing and the plurality of outlet passages in the first nozzle ring, and
- wherein the second cooling fluid outlet in the housing is fluidly coupled to the third cooling fluid supply passage in the second bearing housing and the plurality of outlet passages in the second nozzle ring.

18. The cooling system of claim 16, wherein the stator has a cylindrical shape.

19. The cooling system of claim 16, wherein the first cooling fluid supply passage of the housing includes a cooling fluid inlet configured to fluidly couple the first cooling fluid supply passage to the condenser assembly, the condenser assembly configured to direct the supply of cooling fluid to the cooling system.

20. The cooling system of claim 16, wherein the first nozzle ring and the first bearing housing extend along a central axis of the shaft in opposite directions relative to the first axial end face of the first bearing housing, and wherein the second nozzle ring and the second bearing housing extend along the central axis in opposite directions relative to the second axial end face of the second bearing housing.

* * * * *